April 1, 1941.  F. S. DENISON  2,237,248
CONTROL SYSTEM
Filed Feb. 5, 1938
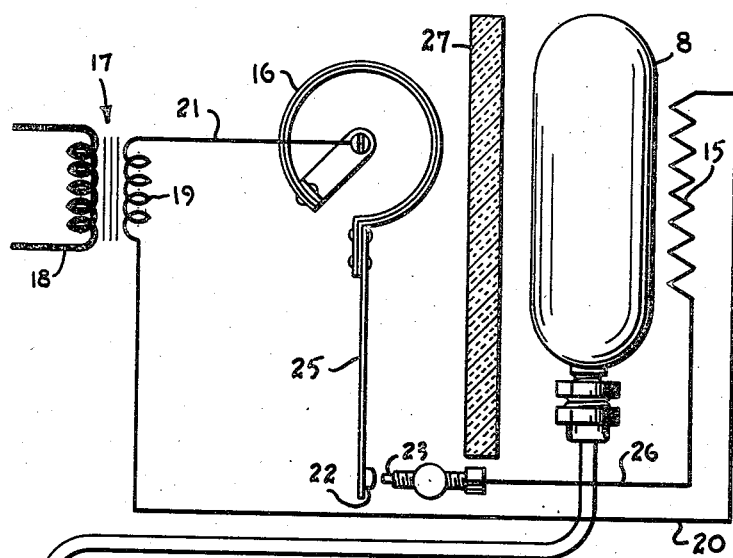
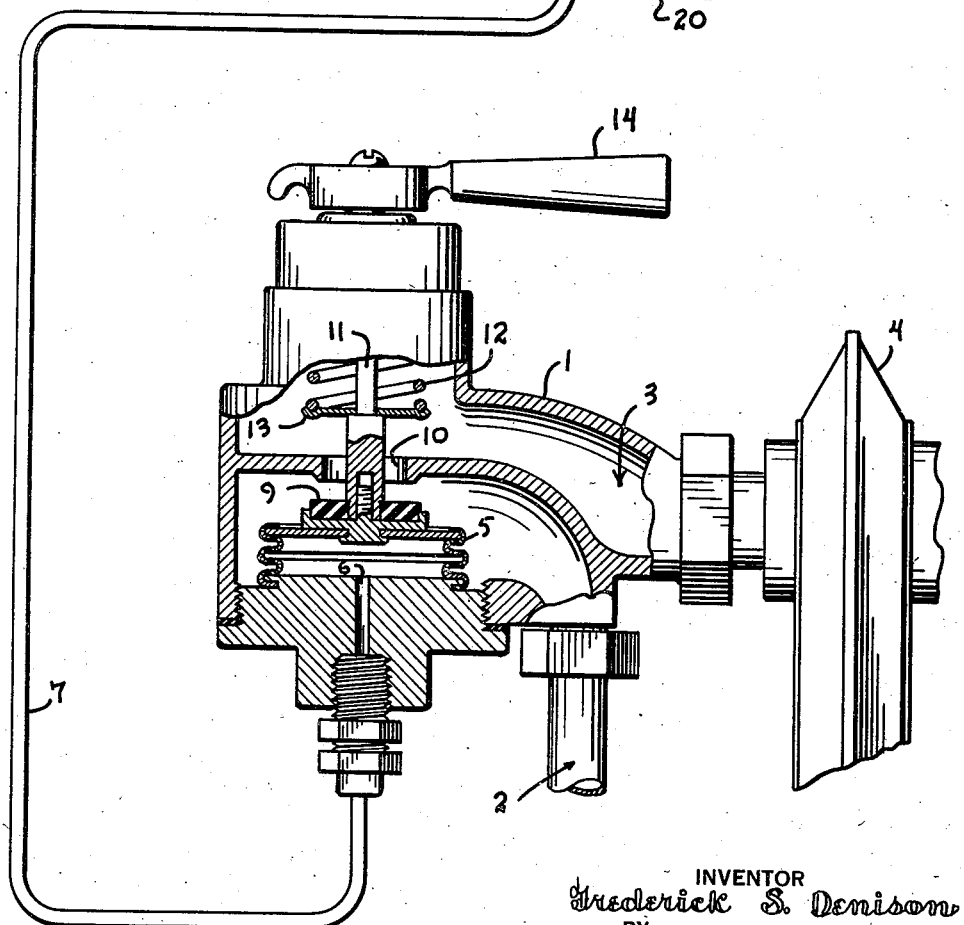
INVENTOR
Frederick S. Denison
BY George H Fisher
ATTORNEY Patented Apr. 1, 1941

2,237,248

UNITED STATES PATENT OFFICE 2,237,248

CONTROL SYSTEM

Frederick S. Denison, Minneapolis, Minn., assignor to Minneapolis-Honeywell Regulator Company, Minneapolis, Minn., a corporation of Delaware Application February 5, 1938, Serial No. 188,939

3 Claims. (Cl. 236—68)

My invention relates to the art of automatic control of temperature and the like and is more particularly concerned with improvements in systems employing automatically controlled modulating valves.

While my invention may be practiced in numerous different types of control systems, for purposes of disclosing the nature and principles of the invention it will be described in connection with a throttling steam radiator valve so regulated as to maintain a predetermined room temperature. Such a valve may be controlled by a temperature responsive thermostatic bulb filled with an expansible fluid medium. Ordinarily, in practice, the thermostat may be set to maintain a room temperature of 70° and may have an operating differential of 2°, for example. That is, the valve may have a 2° throttling range, moving between fully open and fully closed positions corresponding to temperature values of 69° and 71°, respectively, at the control bulb, for instance, and may assume an intermediate position at average heating loads whereby a predetermined temperature of 70° is normally maintained.

It has been found that at the upper limit of the throttling range the valve does not completely close off the steam flow but permits some leakage between the valve and the seat causing continued heating and further rise in the temperature. Before the valve completely seals off the steam flow, it must be urged against its seat with considerable force and during this "squeeze period" when seating of the valve is taking place the temperature will continue to rise, perhaps several degrees before sufficient closing force is established to completely seal off the steam flow. Thus the operating differential of the thermostat is undesirably expanded particularly because a major part of the differential is used up during the "squeeze period" and only a small part is available for throttling of the valve.

It is the object of my invention to eliminate the above described defect in automatic control systems to prevent overshooting of the value of the condition being controlled.

Another object is to provide a modulating control system employing an automatic regulating valve and means for positively seating the valve when it closes to insure that no further flow through the valve occurs.

A further object is to provide a temperature control system comprising a thermostatically controlled throttling valve and a second thermostat for causing heat to be applied to the valve thermostat at the time the valve closes.

The single figure of the drawing shows a steam radiator valve controlled by my improved thermostatic arrangement.

Referring to the drawing, a throttling steam radiator valve 1 is shown having an inlet at 2 and an outlet at 3 connected to a radiator 4 by means of coupling members which may be of any suitable nature. The throttling valve may control the flow of steam to the radiator 4 so as to maintain a room or other space at a predetermined temperature. The valve itself may take any suitable form of throttling valve already known in the art and may be controlled by a temperature responsive element. The valve which I have chosen for purposes of disclosing my invention is operated by a power bellows 5, as shown, the interior of which communicates through a port 6 and a capillary tube 7 with a temperature responsive bulb 8. The valve has a seat disc 9 made of any suitable material which cooperates with a port 10. The valve stem 11 extends through the port 10 and in the upper part of the body of the valve is encircled by a coil spring 12. The coil spring seats on a spring retaining element 13, and its tension may be adjusted by a suitable manual adjusting handle 14.

The temperature responsive bulb 8 for controlling the throttling valve may be constructed as a part of the valve itself or it may be a remote bulb, depending on the particular application of my invention. In the present embodiment, the bulb is shown connected to the valve by a capillary tube and it may be located as desired to produce the most satisfactory operation of the system. It will be seen that adjacent the bulb 8 is an electrical heating resistance 15 which is controlled by a bimetallic thermostat 16. Energy for the heating resistance is supplied from a step-down transformer 17 having a primary winding 18 and a secondary winding 19. The primary winding is connected to a suitable source of power (not snown), while the secondary winding is connected to the heating resistance 15 by a wire 20 and to the thermostat 16 by a wire 21. The thermostat 16 is of conventional type and operates to close electrical contacts 22 and 23 at a predetermined temperature. The contact 23 is in the form of an adjustable screw, as shown, to adjust the operating temperature of the thermostat and is connected to the heating resistance 15 by a wire 26. If desired, a suitable insulating member 27 may be interposed between the thermostat 16 and the temperature responsive bulb 8 and the heater 15 to insure that thermostat 16 will not be affected by heater 15.

In the operation of my improved control system, the thermostatic bulb 8 and throttling valve 1 are adjusted so as to maintain a predetermined temperature in the room being heated of, for example, 70°. Whenever the room temperature rises above 70°, the valve is throttled in closing direction, and in the customary manner of operation of throttling valves reduces the steam flow so as to maintain 70° in the room. Now should the temperature rise for any reason to a predetermined value of, for example, 71°, the valve will be in closed position in which no further steam should flow into the radiator. In my improved system at this valve closing temperature of 71°, the thermostat 16 is set to close the contacts 22 and 23, energizing heater 15. Therefore, as soon as the throttling valve reaches its seat, additional heat will immediately be applied to the bulb 8 increasing the pressure therein and creating a substantial pressure increase within the operating bellows 5, whereby a positive and firm seating force is applied to the valve. It is apparent, therefore, that at the limiting temperature at which the valve closes, my improved arrangement operates to positively prevent any further flow of steam into the radiator. The possibility of further heating after the temperature reaches 71° is therefore precluded and the undesirable overshooting which has been characteristic of previously known control systems is obviated. It will be understood, of course, that in throttling valves a closing force applied to the valve which is sufficient to move the valve to its seat is not sufficient to firmly seat the valve. This is particularly true inasmuch as relatively soft seat discs are used which must be depressed by the valve seat to form a seal. The amount of this depression necessary increases after continued use and it cannot be accommodated for without my improvement. In my system when the valve is to seat, a force is applied to firmly close the valve and positively seal off further flow of steam.

From the foregoing, it should be apparent that I have provided an improved control system which eliminates undesirable overshooting characteristics present in a great many heretofore known systems and which establishes a positive limit beyond which the temperature cannot rise. The maintenance of a desirable narrow operating differential at the thermostat is made possible and consequently more uniform temperatures prevail. This result is accomplished in a positive manner with very inexpensive and reliable apparatus.

While my invention has been disclosed in only one form comprising a thermostatically controlled steam radiator valve, it is to be expressly understood that there are many and varied types of control systems to which its principles may be applied. Other variable factors or conditions than temperature may be controlled by a system employing my invention and it is not to be restricted to heating alone.

There are many variations, modifications and forms which my invention may take, and it is to be understood that the present disclosure is illustrative and the scope of the invention is to be limited only as determined by the appended claims.

I claim as my invention:

1. In a system of the character described, in combination, a modulating control valve, thermostatic means for variably applying a force to said valve for adjusting it in accordance with temperature, said valve assuming a position approaching closed position at a predetermined value of the temperature, another thermostatic means responsive to the same temperature region as said first mentioned thermostatic means, said other thermostatic means being operable at said predetermined value of temperature to apply an additional increment of closing force to said valve for positively and firmly seating the valve and said other thermostatic means being operable to remove said additional increment of closing force in response to temperature.

2. In a system of the character described, in combination, a modulating control valve, thermostatic means for variably applying a force to said valve for adjusting it in accordance with temperature, said valve assuming a position approaching closed position at a predetermined value of the temperature, another thermostatic means responsive to the same temperature region as said first mentioned thermostatic means, said other thermostatic means including a heater and being operable at said predetermined value of temperature to cause said heater to heat said first mentioned thermostatic means whereby an additional increment of closing force is applied to the valve.

3. In a control system, in combination, control apparatus comprising a valve means, condition responsive means for operating the valve means, said condition responsive means being of a modulating type operable to variably position the valve between an open position and fully closed position, the valve reaching its seat at a predetermined value of the condition, said condition responsive means including auxiliary means for positively and firmly seating the valve to prevent seepage therethrough when the condition has reached said predetermined value, said auxiliary means comprising mechanism responsive to said predetermined value of the condition for applying an additional increment of closing force to the valve, said auxiliary means being operative to remove said additional increment of closing force upon change of the condition in the opposite direction while the valve remains at its seat.

FREDERICK S. DENISON.